(12) United States Patent
Bagepalli et al.

(10) Patent No.: US 8,061,999 B2
(45) Date of Patent: Nov. 22, 2011

(54) SPINNER-LESS HUB ACCESS AND LIFTING SYSTEM FOR A WIND TURBINE

(75) Inventors: Bharat S. Bagepalli, Niskayuna, NY (US); Dustin Jon Wambeke, Greenville, SC (US); Scott G. Riddell, Greer, SC (US)

(73) Assignee: General Electric Company, Schenectady, NY (US)

( * ) Notice: Subject to any disclaimer, the term of this patent is extended or adjusted under 35 U.S.C. 154(b) by 540 days.

(21) Appl. No.: 12/275,890

(22) Filed: Nov. 21, 2008

(65) Prior Publication Data

US 2010/0129216 A1    May 27, 2010

(51) Int. Cl.
F01D 5/08    (2006.01)

(52) U.S. Cl. .................................. 416/244 R; 415/123

(58) Field of Classification Search .............. 416/96 R, 416/132 R, 139, 142, 196 R, 226, 241 R, 416/244 R; 415/123
See application file for complete search history.

(56) References Cited

U.S. PATENT DOCUMENTS

| | | | |
|---|---|---|---|
| 7,891,941 B2 * | 2/2011 | Bevington et al. | 415/123 |
| 2007/0273154 A1 * | 11/2007 | Pedersen | 290/44 |
| 2009/0206610 A1 * | 8/2009 | Martin et al. | 290/55 |
| 2010/0122508 A1 * | 5/2010 | Kristensen | 52/651.01 |
| 2010/0181777 A1 * | 7/2010 | Grigg | 290/55 |
| 2011/0113708 A1 * | 5/2011 | Skjaerbaek et al. | 52/223.1 |

FOREIGN PATENT DOCUMENTS

EP    1944508 A2    7/2008

OTHER PUBLICATIONS

NORDEX, Nordex N90/2500 http://pdf.directindustry.com/pdf/nordex-energy-n90-2500/20682-33648.html.

* cited by examiner

*Primary Examiner* — Michael Lebentritt
(74) *Attorney, Agent, or Firm* — Ernest G. Cusick; Frank A. Landgraff

(57) ABSTRACT

A simple and safe means is provided to gain entry into the rotor hub of a wind turbine for maintenance operations within the hub. A ladder-like structure is mounted onto the rotor hub using the same bolts attaching a fixed outer race of the pitch bearing for the rotor blades. The ladder-like structure has integral with it a protective cage to the front, forming a basket. Structural elements for grasping are provided to a worker over the full path traversed from the nacelle to the entry hatch of the hub. An expanded area between rungs may be provided to facilitate entry by a service worker into the safety cage area. Lifting ears made also be formed with tubular sections integrated into the ladder-like structure.

16 Claims, 9 Drawing Sheets

SPINNER-LESS HUB ACCESS AND LIFTING SYSTEM FOR A WIND TURBINE

BACKGROUND OF THE INVENTION

The invention relates generally to wind turbines and more specifically to structures for enhancing installation and maintenance activities related to wind turbines.

Wind turbine towers are large structures, sometimes extending to significant heights to accommodate large wind turbine rotor blades and to strategically place the rotor blades within a wind path. For example, a typical tower may have a height as high as about 100 meters (m). Such a tower may include multiple sections, often a bottom, a middle and a top section. The length and number of individual sections may vary according to the application and height of the structure. At various heights of the wind turbine tower, landings are provided. The landings include openings for ladders to allow operators and maintenance personnel to climb between landings. The landings may also include openings above each other to allow small components, tools and equipment to be lifted from a base of the wind turbine tower to a top landing of the tower.

Mounted on top of the support tower for wind turbines is a nacelle. The nacelle houses, or encloses, the equipment and components of the wind turbine and includes hubs for the wind turbine blades and the power train including the bearing, gearbox and electrical generator for the wind turbine.

FIG. 1 illustrates an exemplary wind turbine tower. Nacelle 102 is mounted atop a tall tower 104, only a portion of which is shown in FIG. 1. Wind turbine 100 also comprises a rotor 106 that includes one or more rotor blades 108 attached to a rotating hub 110. Although the wind turbine 100, as illustrated includes three rotor blades 108, there are no specific limits on the number of rotor blades. The rotating hub 110 may include an access hatch 107 at a forward end.

FIG. 2 illustrates an exemplary internal arrangement for various components housed in nacelle 102. In some configurations, one or more microcontrollers within control panel 112 comprise a control system used for overall system monitoring and control. In some configurations, a variable blade pitch drive 114 is provided to control the pitch of blades 108 (not shown in FIG. 2) that rotor hub 110 as a result of wind. In some configurations, the pitch angles of blades 108 are individually controlled by blade pitch drive 114. Rotor blades attach to the hub on inner flange of a rotating race for rotor blade bearing. A stationary race for the rotor blade bearing is mounted to the hub. Rotor hub 110 and blades 108 together comprise wind turbine rotor 106. A spinner-assembly 105, shaped like a nose cone, may cover the exterior of the hub, including spaces between rotor blades. Access hatch 107 may be provided at the forward end of rotor hub 110. At least one access port 135 may be provided to the internal spaces of spinner assembly 105. At least one rail or ladder 136 may be provided for crossing an outer surface of the spinner assembly to the access port 135. Lifting ears 160 for the rotor hub 110 may be provided.

FIG. 3 illustrates a perspective view of a rotor blade bearing flange of the rotor hub with a removed blade. The pitch drive 114, which is firmly fixed to rotor hub 110, is mounted inside the rotor hub. Drive element 130 of pitch drive 114 is a gear wheel, which interacts with the inner gear rim of flange 132. Flange 132 may be firmly attached to a rotor blade and is rotatably located within rotor hub 110 (attached to the rotating race for the rotor blade bearing). Thus, pitch drive 114 enables a swiveling movement of its corresponding rotor blade, whereby the swivel axis of the rotor blade is roughly parallel to the longitudinal axis of the blade. Outer flange 134 may hold stationary race for the rotor blade bearing and is bolted with a plurality of peripheral bolts 111 to the rotor hub 110.

The bolts 111 holding outer flange 134 may currently also serve for mounting of lifting ears 160 in place on the hub 110. As mounted, the lifting ears 160 may project generally radially from the hub 110, and circumferentially with respect to the outer flange 134 of the rotor blade bearing, such that lifting ears on adjacent rotor blade bearing outer flanges 134 line up. A plurality of holes 165 may be provided in the lifting pads 160 for lifting slings to enable lowering and hoisting of the hub 110 to its operating position on the tower.

While such dedicated lifting pads are functional for hub lifts, each lifting pad may weigh about 300 lbs and is expensive for the this limited function. Further, unnecessary weight at the top of a 100 meter tower is undesirable.

Again referring to FIG. 2, the wind turbine includes a main rotor shaft 116 connected to hub 110 via main bearing 119. Gearbox 118 drives a high-speed shaft of generator 120. In other configurations, main rotor shaft 116 is coupled directly to generator 120. The high-speed shaft (not identified in FIG. 2) is used to drive generator 120, which is mounted on mainframe 117. In some configurations, rotor torque is transmitted via coupling 122.

FIG. 4 illustrates a spinner assembly 105 for a wind turbine hub in greater detail. A strong, but lightweight exterior covering of fiberglass or the like is provided to form a front nose section 151 with three extensions 152 formed to the rear. The rear directed extensions 152 may cover the hub area between the rotor blades. Each extension may be mounted to an exterior surface on the hub with multiple struts 153, thereby providing support for the entire spinner assembly. The spinner assembly 105 may provide for three access ports 135, one between the nose section 151 and each extension piece 152. The exterior surface of the spinner extension may include a fiberglass rail or a fiberglass ladder 136 with rungs for the operator to climb on. When the hub is aligned such that any of the three access ports is on top, a worker may climb over the hub, using the rail or ladder 136 and enter the spinner assembly 105 through the access port using the associated ladder 136. Once inside the spinner assembly, the worker may use a ladder complex 138 to move about to get to a front hatch 107 of the huh, from which entrance to the hub is possible.

FIG. 5 illustrates an isometric view of a typical hub arrangement with the spinner assembly removed. Front hatch 107 is opened to gain access to the interior of the hub 110.

While the spinner assembly provides a nose cone and entry scheme to the front hatch of the hub, it is an expensive component and it is not required for a streamlined wind flow around the nacelle. At the same time, the access route between the nacelle and the access ports into the spinner may provide limited gripping points for a worker traversing the route, while at a height of over 100 meters from the ground.

Accordingly, there is a need to provide a safe and effective way for operators to gain entry to the hub, without requiring major changes to the hub structure.

BRIEF DESCRIPTION OF THE INVENTION

The present invention relates to an access and lifting system, adapted to gaining entry to a rotor hub for a wind turbine. Briefly in accordance with one aspect of the present invention, the access and lifting system includes a wind turbine tower with a nacelle including a rotor hub mounted at a forward end of the nacelle. The rotor huh supports a plurality of rotor blades distributed circumferentially around the rotor hub and includes a forward hatch. Each rotor blade includes a pitching mechanism employing a pitch bearing.

A ladder-like structure is positioned over a surface of the hub mainly between adjacent rotor blades. The ladder includes a plurality of rungs distributed axially along a length of the structure and including the mounting elements on both opposing side-members of the ladder. The mounting elements on each individual opposing side-member are attached to the hub at a junction between the hub and the pitch bearing for the adjacent rotor blade.

According to a second aspect of the present invention, a method for accessing an interior of a rotating hub for a wind turbine. The method includes positioning a rotor for the wind turbine to locate an exterior climbing surface for a hub ladder at a topmost position of hub rotation with respect to the ground and having an operator climb over the exterior climbing surface of the hub ladder forward from an area adjacent to a nacelle.

According to a further embodiment of the present invention, a method for lifting a hub of a rotor for a wind turbine is provided. The method may include providing lifting ears integral to a ladder-like structure adapted for mounting on the hub between adjacent rotor blades and then bolting the ladder-like-structure to the hub at the rotor pitch bearing. Lifting slings are attached to lifting ears formed integral to a ladder-like structure. Then a lift of the hub is performed using the lifting slings to raise the hub to a mounting position at the nacelle.

BRIEF DESCRIPTION OF THE DRAWING

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

The following embodiments of the present invention have many advantages, including providing a simple means to gain entry into the hub for installation and maintenance operations. The embodiment includes ladder-like frames or strictures (also referred to as ladder) that are mounted onto the hub using elements of the hub flanges for rotor blades. In one embodiment, each individual ladder may be attached on each side to an adjacent hub flange using the same bolts now used to attach the fixed outer-race of a pitch bearing to the hub flange. The individual ladder has integral with it a protective cage section at the front. Together with the protective cage sections of other individual ladders positioned between other pairs of adjacent hub flanges, a fully enclosed protective cage at the front of the hub is provided for the service worker. The service worker has satisfactory structural elements to grasp as he guides his way into the huh hatch at the front. Additionally, lifting ears for the hub may also be integrated with the frame of the ladder.

Access into the hub is achieved by climbing from the nacelle on the outside of the ladder over the hub. At the front end, the fully enclosed protective cage is constructed such that there is enough room for a service person to transfer from a position atop the ladder to a position within the protective cage, and then into the entry hatch at the front of the hub. The entire structure can be constructed as a welded assembly or a bolted assembly. Alternatively, the structure could also be made of a combination of welded and/or bolted assembly. Preassembly of the ladder onto the hub may be performed at the factory.

The present invention will eliminate a need for the entire spinner structure and spinner mounting assembly, and the large lifting ears. Together, elimination of the spinner structure/mounting assembly and the large lifting ears is expected to save substantial amounts of material and labor costs, while at the same time enhancing the ease and safety of entry into the hub. Further, the mounting for the ladder structure makes use of existing features on the hub, eliminating the need for dedicated mounting features previously used for earlier ladder arrangements.

Figure 1:
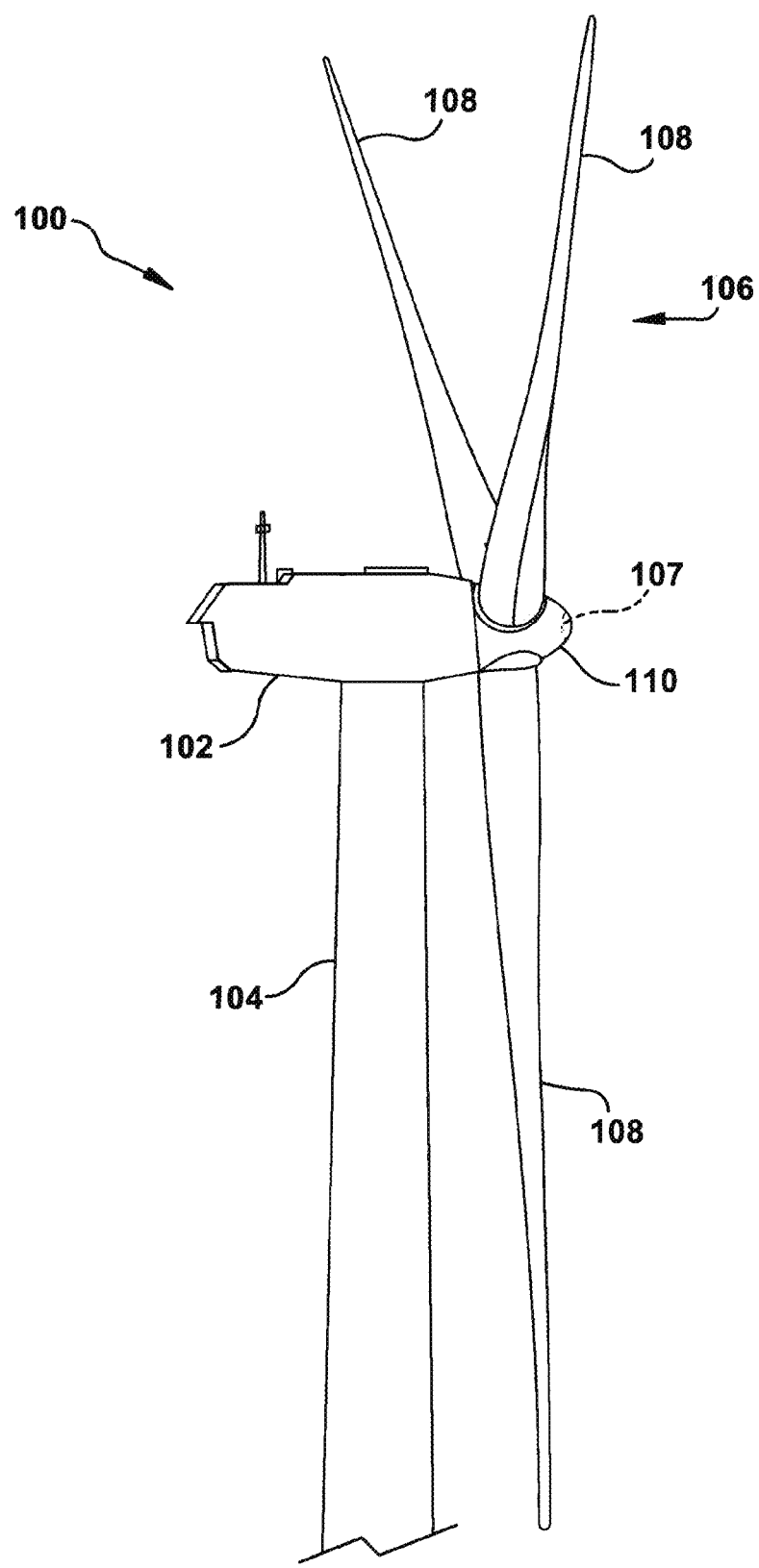
FIG. 1 illustrates an exemplary wind turbine tower.
Figure 2:
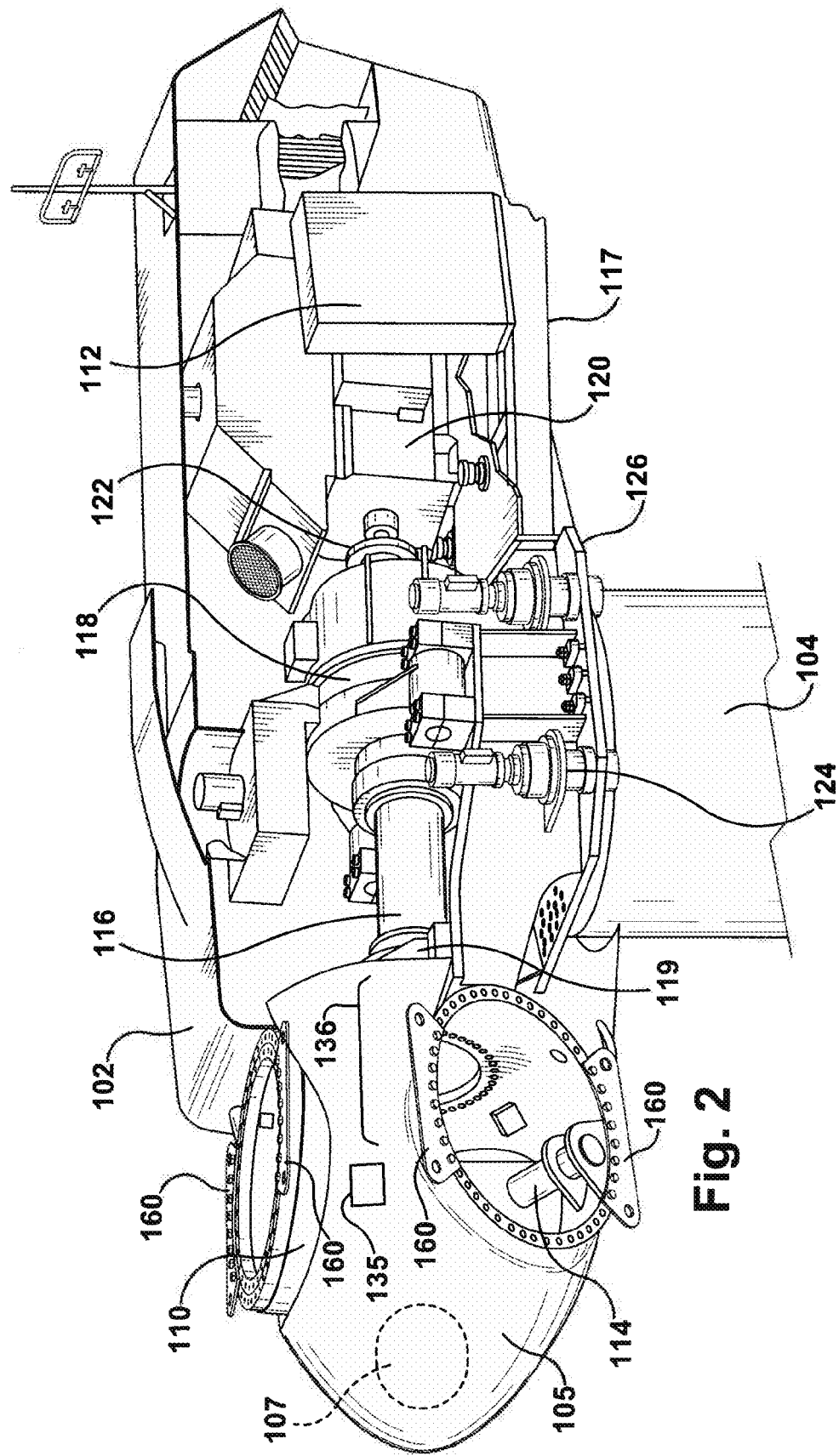
FIG. 2 illustrates an exemplary internal arrangement for various components housed in nacelle.
Figure 3:
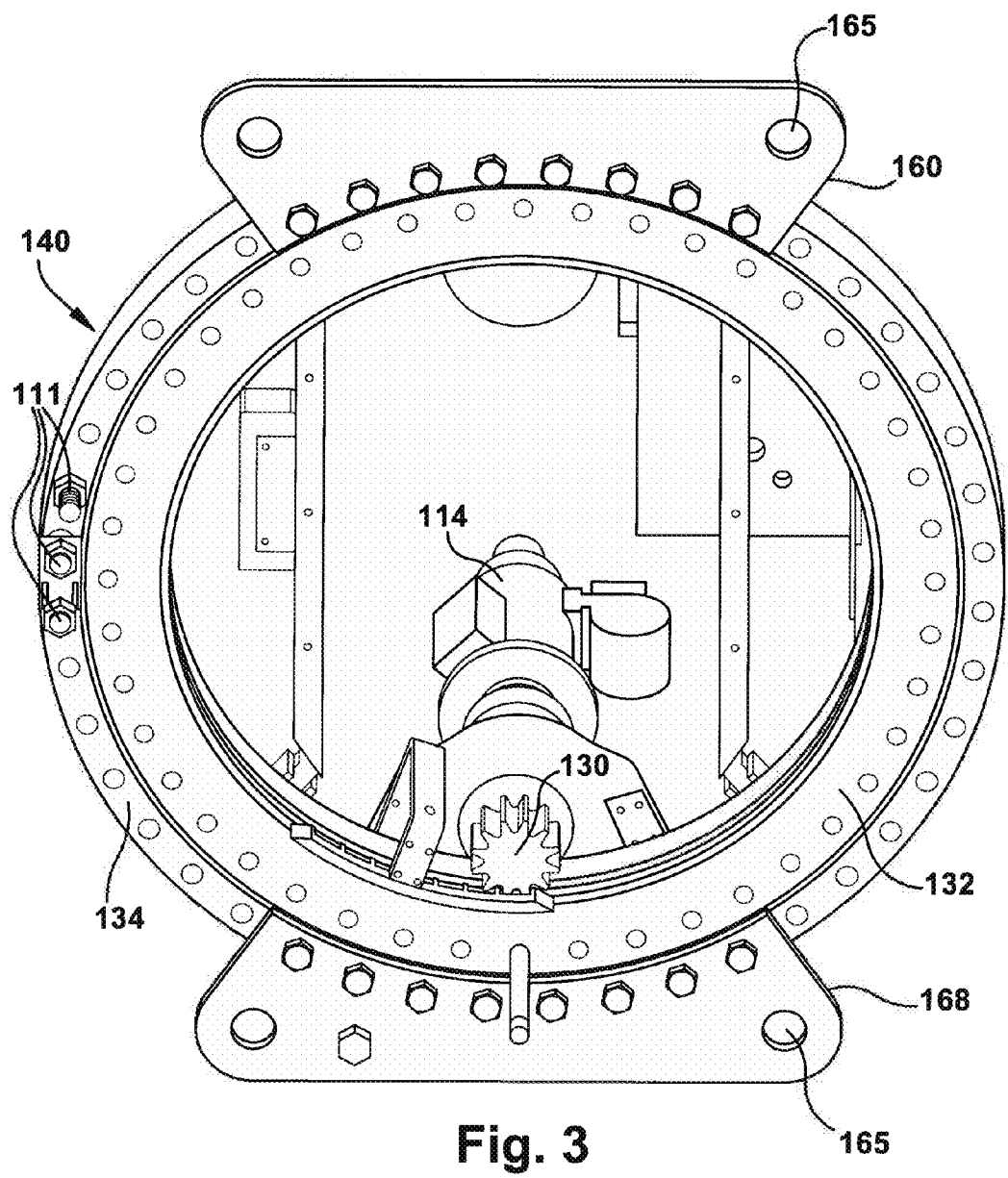
FIG. 3 shows a perspective of a rotor blade bearing flange of the rotor hub with a removed blade.
Figure 4:
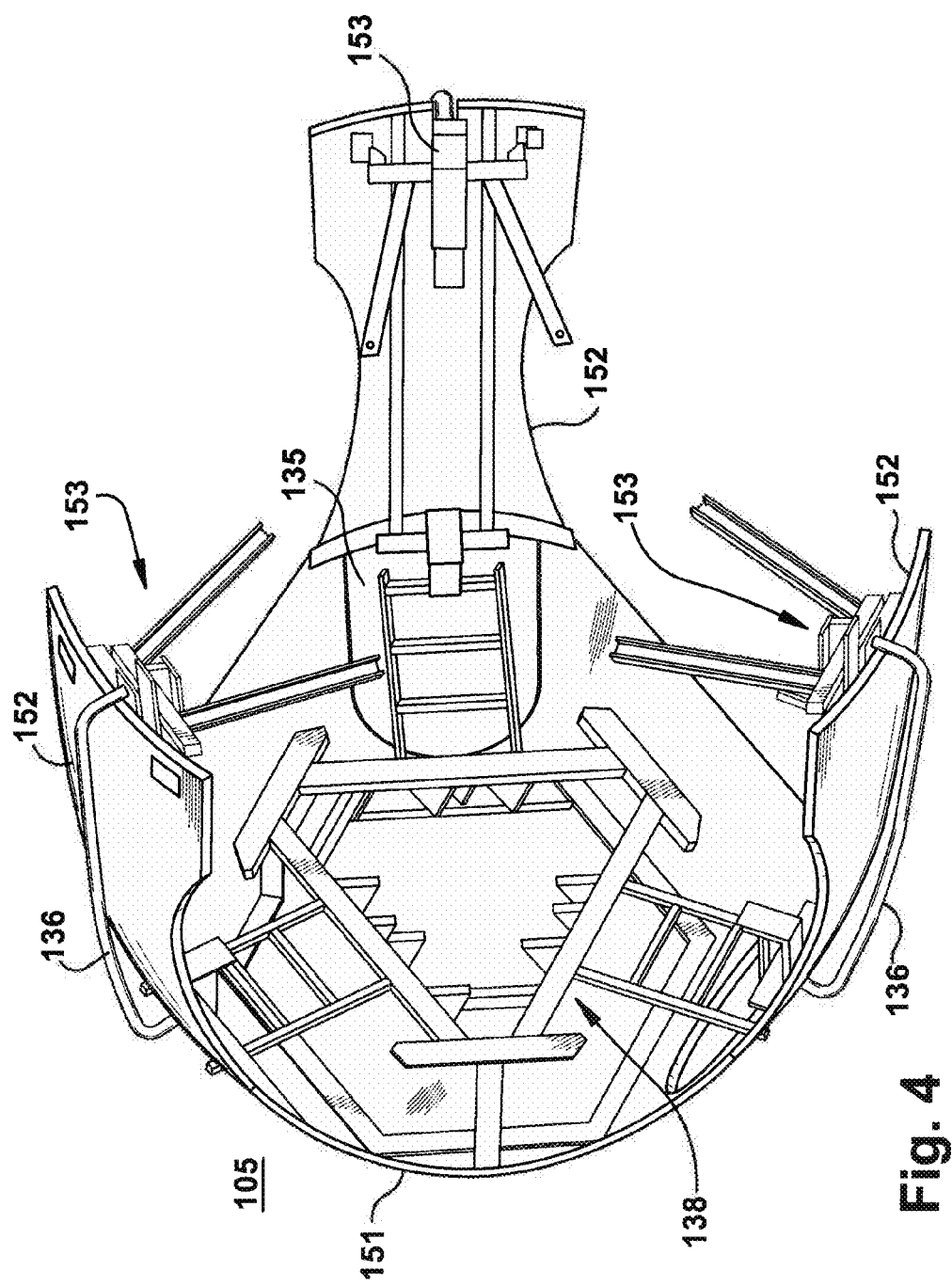
FIG. 4 illustrates a spinner assembly for a wind turbine hub in greater detail.
Figure 5:
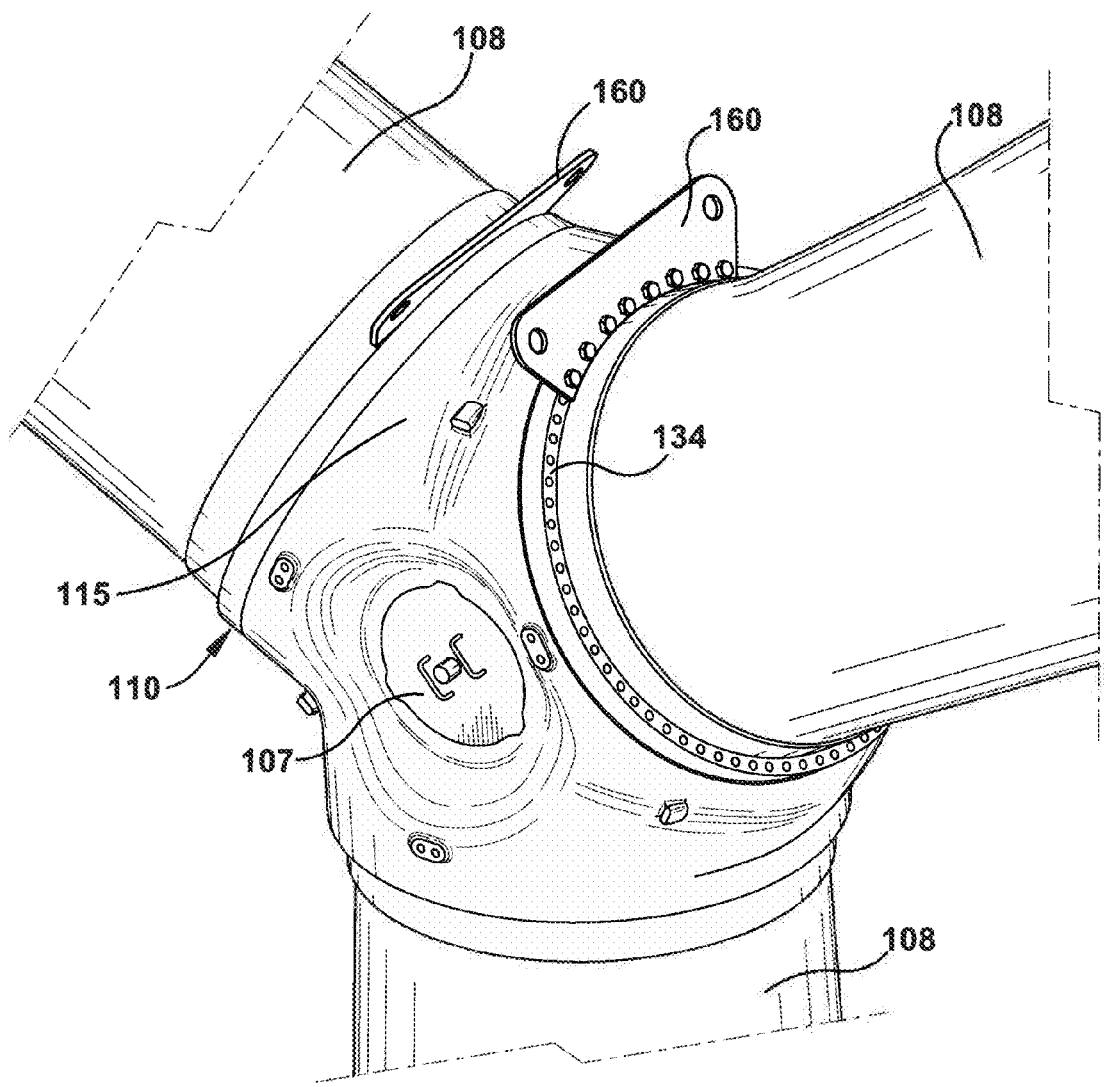
FIG. 5 illustrates an isometric view of a typical hub arrangement without spinner assembly.
Figure 6A:
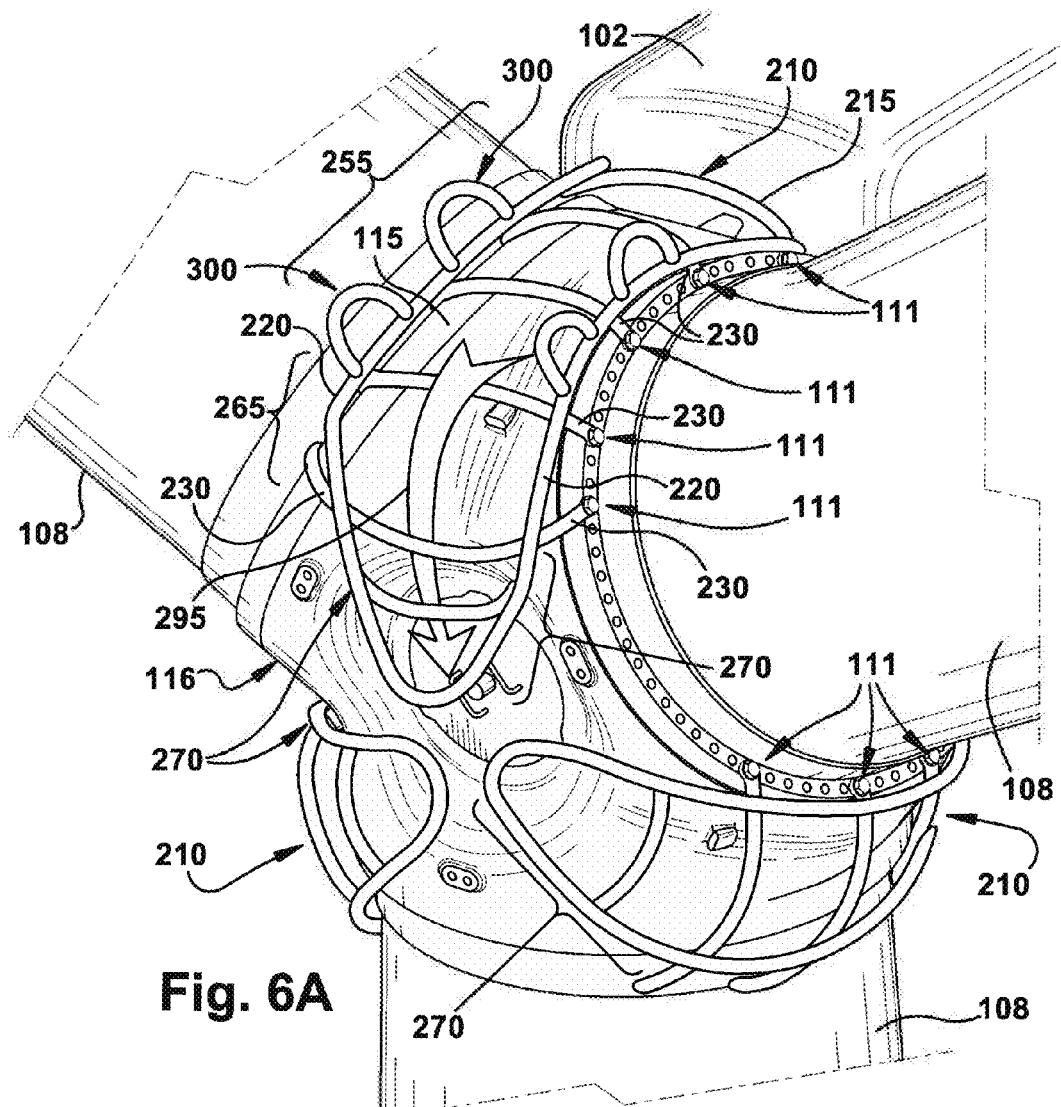
FIG. 6A illustrates one embodiment for the inventive access and lifting system, adapted to gaining entry to a rotor hub for a wind turbine.

FIG. 6A illustrates one embodiment for the inventive access and lifting system, adapted for gaining entry to a rotor hub for a wind turbine. The system may include a wind turbine tower 104 with a nacelle 102 including a rotor hub 110 mounted at a forward end of the nacelle. The rotor hub 110 supports a plurality of rotor blades 108 distributed circumferentially around the rotor hub and includes an entry hatch 107 at a forward end. Each rotor blade 108 includes a pitching mechanism 114 (FIG. 2) employing a pitch bearing.

A ladder-like structure (also referred to as ladder) 210 may be positioned over a surface of the hub 110 mainly between adjacent rotor blades 108 including a plurality of rungs 215 distributed axially along a length of opposing side-members 220 of the ladder. The rungs 215 may be extended outward beyond the opposing side-members 220 and downward to include mounting elements 230. The mounting elements 230 on an individual side-member 220 may mount to the hub 110 at a junction 260 between the hub 110 and the pitch bearing 140 for the adjacent rotor blade. Alternatively, and for advantageous placement of the mounting elements along the axial length of the ladder 210, the mounting arms 230 may be originate at the individual side-member 230 and extend to the junction 260 without being an extension of the rungs.

Figure 6B:
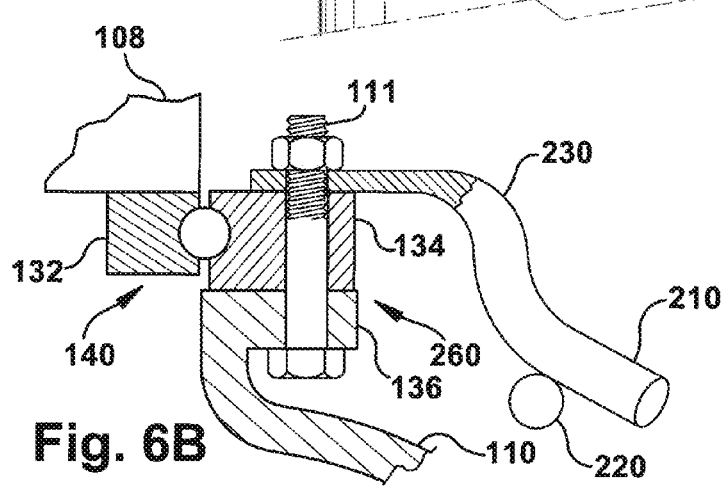
FIG. 6B illustrates a cross sectional view for attachment of mounting arms of the ladder to the junction of the pitch bearing and the rotor blade flange on the hub.

FIG. 6B illustrates a cross sectional view for attachment of mounting arms of the ladder to a junction 260 of the pitch bearing and the rotor blade flange on the hub. The mounting elements 230 on each individual opposing-side member 220 of the individual ladder 210 may be directly mounted to flange 134 for the outer fixed race of the pitch bearing 140 for the adjacent rotor blade. A plurality of mounting bolts 111 may mount flange 134 of the outer fixed race of the pitch bearing 140 to the hub flange 136 of hub 110. The same mounting bolts 111 may attach the mounting elements 230 on each individual opposing-side member 220 of the ladder 210 to hub flange 136 through flange 134. In an alternative arrangement for mounting, the hub flange 136 may extend outward radially beyond the pitch bearing 140 and provide a bolting hole arrangement adapted to attaching mounting elements 230 of the ladder 210 directly to the hub flange 136.

The number of arms and the specific bolting arrangements may be adapted to accommodate different size hubs and bolting patterns on the hub.

The ladder may be arranged from tubular stock, the frame being welded, bolted or combination of a bolted and a welded construction. As is known in the art, the tubular stock may be provided in a variety of cross sections advantageous to the grasp of a service worker. Safety rails, as known in the art, may be attached to the side-members 230 of the ladder 210 for hookups to which the service worker may attach a safety harness.

The ladder 210 may extend over the hub surface 115 from an area adjacent to the nacelle 102 to an area forward of the entry hatch 107 on the hub 110, including a part extending in front of the hub, forming a safety cage section 270. The width between opposing side-members 220, the number of rungs 215 along the length of the ladder, the number of mounting elements 230 attached to the hub 110, and similar details may be adapted to the size and arrangement of the hub for a specific wind turbine.

The ladder 210 includes a main section 255 extending over the top surface area 115 of the hub 110, generally between the rotor blades 108. An access part 265 of ladder 210 may include an extended access space 275 between a rung 276 on the main section of the ladder and a rung 277 at a rear end of the safety cage section 270, adapted to allow a service person carrying tool or equipment (in a backpack for instance) to pass therebetween. The extended access space 275 may be enhanced by the bowing forward of rung 277, for example. The safety cage section 270 may extend to an area forward of the entry hatch 107.

Opposing-side members 220 of the ladder 210 may extend symmetrically along the axial length of the ladder. A width of the rungs generally may expand in transition from the main section 255 to the safety cage section 270 to provide a more full enclosure for the service person in the space forward of the entry hatch 107. At the most forward part of the safety cage section 270, the rungs 210 may shorten in width, wherein the side-members 220 for the individual ladder 210 join together. Further, other additional cross-members may be provided in the safety cage section 270 to enhance the enclosure.

In the instant case of a rotor with three blades, three individual ladders 210 are provided to form a complete forward enclosure. One individual ladder 210 is provided over the hub surface 115 between each adjacent pair of rotor blades 108. Any member of the three ladders 210 coming together offers a robust "holding place" or anchor for safety harnesses of the service person. The access section 265 of the ladder, coupled with the safety cage section 270 at the forward end, provides enhanced safety and ease of entrance to the hub over previous external access arrangements (without spinner assemblies) where the worker was required to make a transition from a ladder to a front cage over a wide gap without a continuity of gripping holds.

Figure 7:
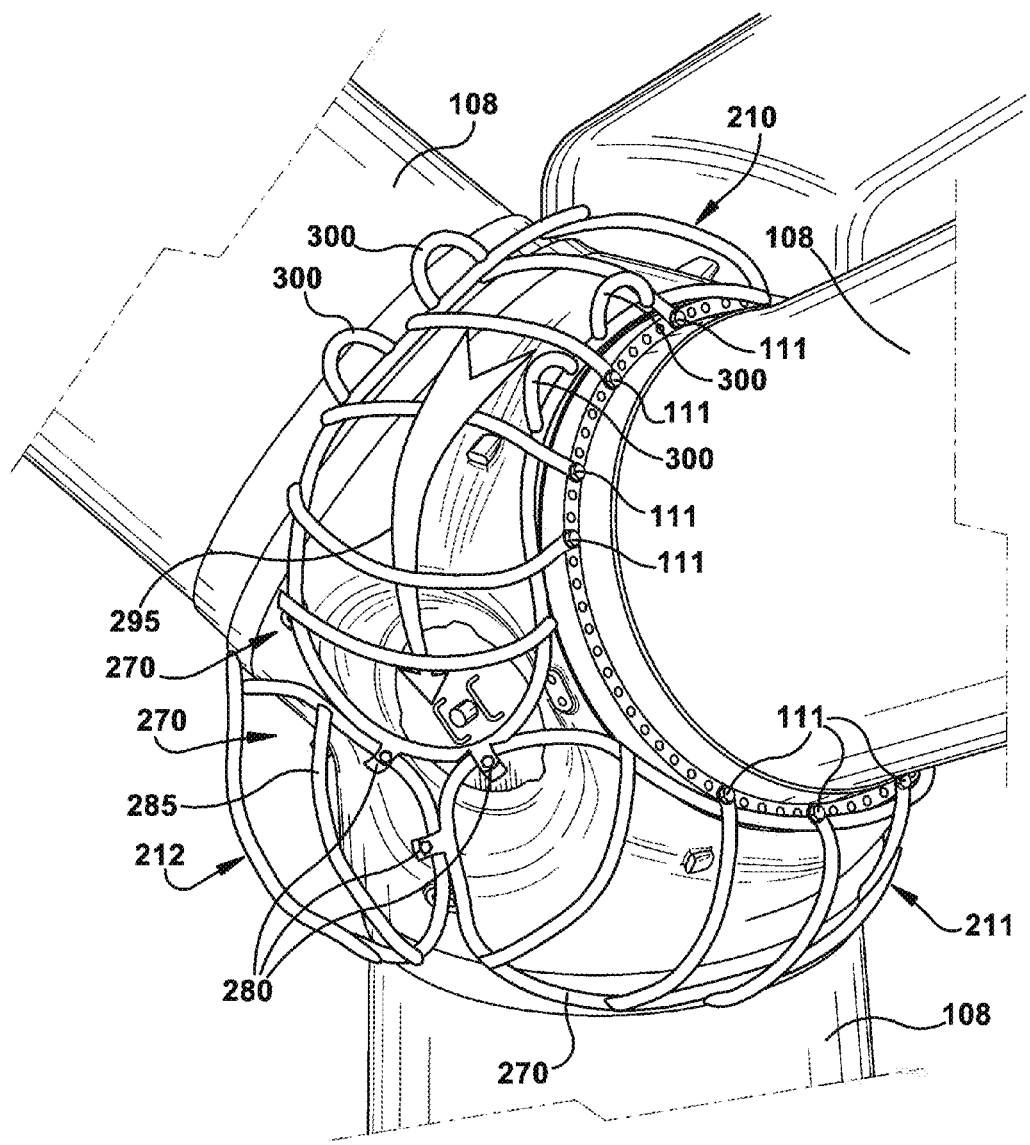
FIG. 7 illustrates a second embodiment for the for the inventive access and lifting system, adapted to gaining entry to a rotor huh for a wind turbine.

FIG. 7 illustrates a second embodiment for the for the inventive access and lifting system, adapted to gaining entry to a rotor hub for a wind turbine. A forward part of the safety cage section 270 for the individual ladder 210 may fixedly engage at a forward end with a forward end of second ladder 211 and a third ladder 212 to form a full enclosure 285 around the entry hatch. Such arrangement for fixedly engaging at a forward end of the ladders may include, but not be limited to a bolted arrangement 280.

Figure 8:
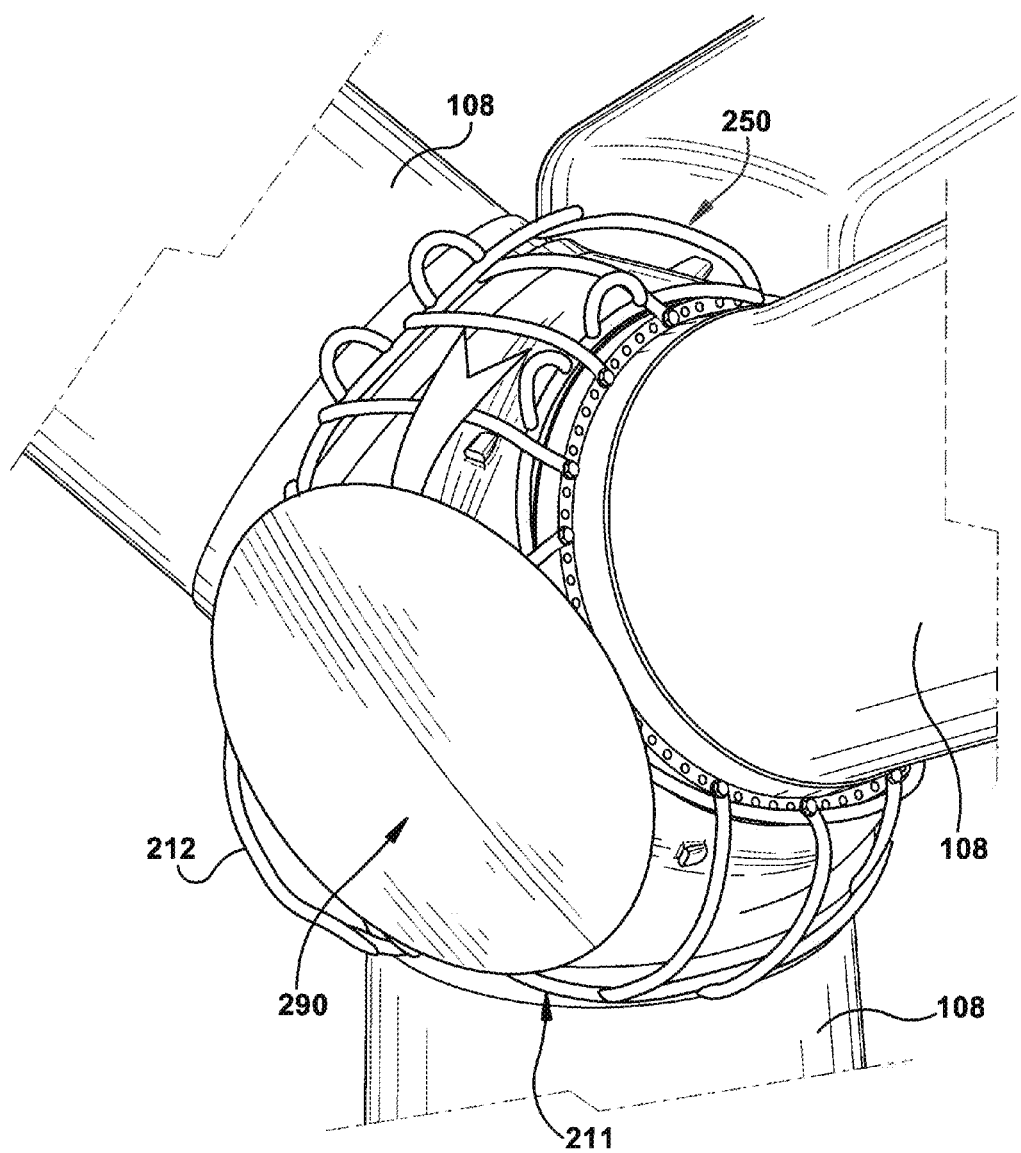
FIG. 8 illustrates a third embodiment for the for the inventive access and lifting system, adapted to gaining entry to a rotor hub for a wind turbine.

FIG. 8 illustrates a third embodiment for the inventive access and lifting system, adapted to gaining entry to a rotor hub for a wind turbine. A shell 290 may be fixedly attached to the combined safety cage sections 270 of the three ladders 210, 211, 212 around the entry hatch 107 of the hub 110. The shell 290 may be fixedly attached to an outside surface of the three safety cage sections around the entry hatch as shown in FIG. 8A. The shell 290 may include a lightweight material such as fiberglass, thereby providing enhanced protection from wind and precipitation for the worker and the inside of the hub when the entry hatch is open. Attachment of shell 290 to the safety cage sections 270 may be performed according to known methods of attachment.

Again referring to FIG. 6, a set of lifting ears (lugs) 300 may be provided integral to the ladder 210. These lifting ears 300 may be used for lifting the entire hub 110 with or without the blades 108. One pair of lifting ears may be provided on each opposing-side member 220 for each individual ladder 210. The lifting ear may be in the form of a tubular loop extending outwardly away from the hub surface attached to the opposing-side member of the ladder. Even though it is only necessary to provide one set of lifting ears for lifts of the hub, an embodiment may include lifting ears between each adjacent set of rotor blades to take advantage of common parts etc. Also, this might have the added advantage of easier serviceability since each of the three 120-degree segments (for a three rotor blade application) would present an opportunity for lifting. While the lifting lug is illustrated as a tubular loop, it should be understood that the lifting lug may be formed to the frame of the ladder 210 in various configurations, such as a plate with an eye.

The lifting ears may be formed from the same material used for the ladder or of a different material. In one arrangement, the lifting ears may form one or more loops off each side-member of the ladder. The loops may preferentially centered with respect to a forward-aft orientation of the hub outer surface between rotor blades and offer two-point lifting contact for forward-to-aft lifting stability.

Figure 9A:
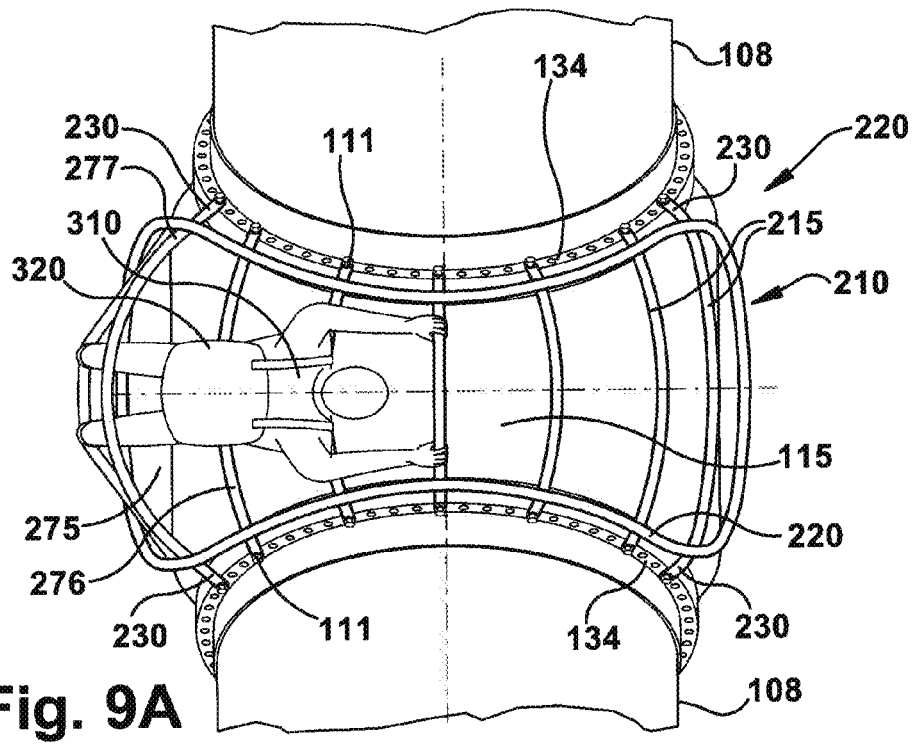
FIG. 9A illustrates a top view of a service person climbing over an embodiment of a hub ladder to access a front safety cage section for entry into the hub.
Figure 9B:
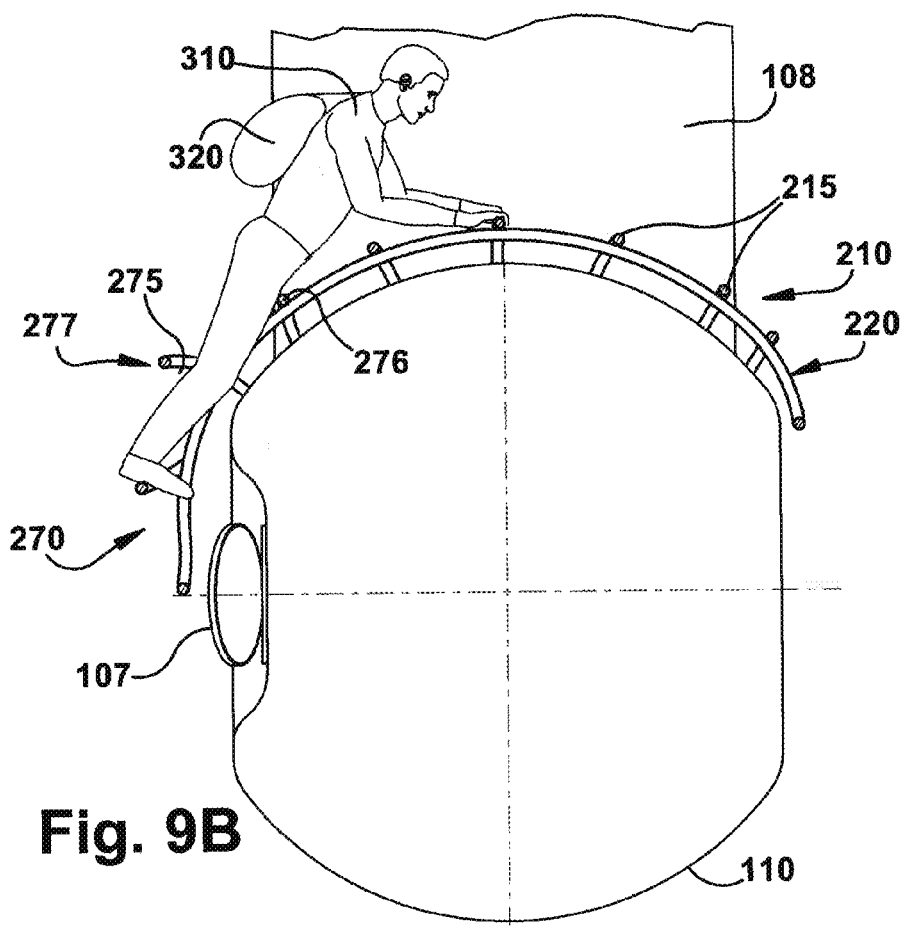
FIG. 9B illustrates a side view of a service person climbing over an embodiment of a hub ladder to access a front safety cage section for entry into the hub.

According to another aspect of the present invention, a method is provided for accessing an interior of a rotating hub for a wind turbine. FIG. 9A and FIG. 9B illustrate a top view and a side view, respectively, of a service person climbing over an embodiment of a hub ladder to access a front safety cage section for entry into the hub. To enhance clarity, only one ladder 210 of the three ladders used to form the enclosure of the forward safety cage 270 is shown. The steps include positioning a rotor for a wind turbine to locate a hub ladder 210 at a topmost position of hub rotation with respect to the ground. A service person 310 climbs over the outside of the hub ladder 210 forward from an area adjacent to a nacelle. The service person 310 enters between adjacent rungs 215 of an access part of the ladder into a safety cage section 270 upon reaching an access opening 290 in the ladder. Rung 277 may be advantageously bowed forward to provide greater access space. A large access space may be required as service person 310 may be required to carry tools and equipment, in a backpack 320 as an example. The service person 310 opens the entry hatch 107, and then enters into the hub. The method may further include protecting the operator at the forward end of the entry hatch by shielding with a shell.

Also provided is a method for lifting a hub of a rotor for a wind turbine. The method may include providing lifting ears integral to a ladder-like structure 210 adapted for mounting on the hub between adjacent rotor blades 108 and then attaching the ladder-like-structure to the hub at the rotor pitch bearing. Lifting slings are attached to lifting ears formed integral to a ladder-like structure. Then a lift of the hub is performed using the lifting slings to raise the hub to a mounting position at the nacelle. The step of bolting the ladder-like structure to the hub may include preassembling the ladder-like structure to the hub at a factory. The lifting of the hub may be performed either with blades attached or without blades attached.

While various embodiments are described herein, it will be appreciated from the specification that various combinations of elements, variations or improvements therein may be made, and are within the scope of the invention.

The invention claimed is:

1. An access and lifting system, adapted for gaining entry to a rotor hub for a wind turbine, comprising:
a wind turbine tower with a nacelle including a rotor hub mounted at a forward end, wherein the rotor hub supports a plurality of rotor blades distributed circumferentially around the rotor hub and includes an entry hatch and a pitching mechanism for each rotor blade including a pitch bearing; and
a plurality of ladder-like structures, each structure positioned over a surface of the rotor hub centered between adjacent rotor blades and each structure including a plurality of rungs distributed axially along a length, opposing side-members, and mounting elements on both the opposing side-members, wherein the mounting elements attach the structure to the rotor hub at a junction between the rotor hub and the pitch bearing for the adjacent rotor blade.

2. The access and lifting system according to claim 1, wherein the pitch bearing further includes an outer fixed race with a flange surface, wherein the mounting elements on each individual opposing-member of the ladder-like structure are attached at the flange surface of the outer fixed race of the pitch bearing for the adjacent rotor blade.

3. The access and lifting system according to claim 2, further comprising:
a mounting surface on a flange of the rotor hub flange extending outward radially beyond the flange for the pitch bearing, wherein the mounting elements of the ladder-like structure attach directly to the mounting surface on the flange of the rotor hub.

4. The access and lifting system according to claim 2, further comprising:
a plurality of mounting bolts for the flange surface of the outer fixed race of the pitch bearing, wherein the mounting elements on each individual opposing-member of the ladder-like structure are attached with the mounting bolts to the outer fixed race of the pitch bearing for the adjacent rotor blade.

5. The access and lifting system according to claim 4, wherein the mounting elements comprise arms extending from the ladder-like structure to the mounting bolts.

6. The access and lifting system according to claim 4, wherein the ladder-like structure comprises:
a welded frame.

7. The access and lifting system according to claim 4, wherein the ladder-like structure comprises:
a bolted frame.

8. The access and lifting system according to claim 4, wherein the ladder-like structure comprises:
a combination of a bolted frame and a welded frame.

9. The access and lifting system according to claim 4, wherein the ladder-like structure extends over a surface of the hub from an area adjacent to the nacelle to an area forward of the entry hatch of the hub including a safety cage section in front of the hub and an access to the safety cage section.

10. The access and lifting system according to claim 9, wherein the access to the safety cage section includes an extended space between a pair of adjacent rungs adapted for allowing a service person to enter the safety cage section.

11. The access and lifting system according to claim 10, wherein the extended space between a pair of adjacent rungs includes a bowing of the forward rung of the pair of adjacent rungs, adapted for providing greater access.

12. The access and lifting system according to claim 11, wherein a forward part of the safety cage section for each of the plurality of ladder-like structures on the hub surfaces area between adjacent rotor blades fixedly engages each other at a forward end to form a full enclosure around the entry hatch.

13. The access and lifting system according to claim 12, wherein the forward part of the safety cage for the individual ladder-like structures on the hub surfaces area between adjacent rotor blades fixedly engage at a forward end in a bolted arrangement.

14. The access and lifting system according to claim 12, further comprising: a shell fixedly attached to the full enclosure around the entry hatch.

15. The access and lifting system according to claim 13, wherein the shell fixedly attached to the full enclosure around the entry hatch is attached on an outer side of the full enclosure.

16. The access and lifting system according to claim 4, further comprising: a plurality of lifting ears attached fixedly to each of the side-members of the ladder-like structure.

* * * * *